Patented May 24, 1938

2,118,482

UNITED STATES PATENT OFFICE 2,118,482

SYNTHETIC RESIN AND PROCESS OF MAKING SAME

Theodor Sutter, Basel, Switzerland, assignor to Ciba Products Corporation, Dover, Del., a corporation No Drawing. Original application June 30, 1931, Serial No. 548,038. Divided and this application January 24, 1936, Serial No. 60,703. In Switzerland July 9, 1930

9 Claims. (Cl. 260—3)

This invention relates to synthetic resins from primary aromatic amines and aldehydes. It comprises the process for the manufacture of these resins, the new products themselves, as well as the application of same in the industry of synthetic resins.

In Patent 2,002,601 and in the copending specifications Serial No. 398,267, filed October 8, 1929, and No. 400,154, filed October 16, 1929, there are described various substances which when added to condensation products made in the presence of a mineral acid from primary aromatic amines and formaldehyde compounds profoundly vary the properties of these products, for instance their fluidity, durability, solidity at raised temperature and the like. As such additional substances there are named in the said specifications hardening agents consisting of aldehydic compounds, such as aldehydes, substances which yield aldehyde, aldehyde condensation products capable of being hardened; also fluxing agents, such as fusible aldehyde condensation products and others.

According to the said specifications, the finished acid-free, dried and comminuted amine-formaldehyde-resin is incorporated with the added substance by mixing them together or by spraying or some similar operation.

It has been found on further investigation that the most complete homogeneity possible of the mixture is of the greatest importance for the production of the best possible properties in the final product. By intermixture in a dry condition complete homogeneity can only be attained with a considerable expenditure of time. Moreover, many of the additional substances available are viscous, syrupy or smeary masses which can be distributed uniformly in a substratum only with difficulty. When it is sought to overcome this objection by using solvents, the mixture must be afterwards freed from the solvent, which necessitates a further operation and loss.

It has now been found that very valuable products are obtained by adding an aldehydic compound to the condensation product resulting from the reaction of the primary aromatic amine and the formaldehyde compound in presence of the mineral acid at a stage prior to the drying of the resinous material.

The present invention is based on the observation that the freshly precipitated amine resins made from aromatic amines and formaldehyde, probably in consequence of their extraordinarily large surface, have so high a capacity for adsorbing organic substances that they take up and firmly retain components of such substances which are to some extent at least soluble in water, so that even by thorough washing only inconsiderable losses of such substances occur. In consequence of this property it is possible that many additional substances, such as aldehydes and any kind of aldehyde condensation products, which may act merely as fluxing agents, or may develop a hardening action on the resins, may be combined directly in aqueous solution with the amine-formaldehyde-resins thereby to obtain not only a particularly uniform distribution but also to avoid the isolation of the additional substance which is frequently tedious and costly, for even oily and syrupy substances are uniformly precipitated by adsorption on the voluminous formaldehyde resins, there being obtained precipitates that are easily filtered, washed, dried and pulverized.

The process of the invention is particularly valuable for fixing the resins homogeneously on and in substrata, such as paper pulp, wood-meal, asbestine, paper, textile fabrics or the like. The more freely flowing products obtainable by this invention permit a more complete penetration of the substratum and the application of lower pressures.

The introduction of the additional substances hereinbefore named may occur at any stage of the manufacture of the amine-formaldehyde-resin. Slowly reacting aldehydic compounds, such as furfural or benzaldehyde, as well as aldehyde condensation products may be dispersed even in an acid condensation solution, in which case, when the resin is separated they are simultaneously thrown down. Additional substances soluble in bases, such as phenol alcohols or phenol resins, may be dissolved in the base serving for eliminating the acid and in this manner precipitated together with the resin. (By the term "phenol alcohols" the products resulting from the reaction of formaldehyde upon phenols in presence of cold aqueous alkali are understood. They are also known as methylol-phenols, methylol-cresols etc.). It is also practicable to stir or knead powerfully the neutral or basic suspension of the separated amine-formaldehyde-resin with the additional substance, which for this purpose may be dissolved in a solvent miscible with water, or the said suspension may be mixed with an alkaline solution of a phenol-aldehyde condensation product and the latter then precipitated on the amine-formaldehyde-resin by careful acidification. In all cases the mixed product, freed from acid, if necessary after previous heating to facilitate filtration, is filtered, washed free from electrolytes and dried.

The molding powders may be molded in the usual way by application of heat and pressure. In certain cases they flow so easily and have such a high stability at moderate temperatures that they can be hardened in molds without pressure.

The following examples illustrate the invention, the parts being by weight:—

Example 1

93 parts of phenol are dissolved in 200 parts of caustic soda solution of 20 per cent. strength, 200 parts of formaldehyde of 38 per cent. strength are added in the cold and the whole is allowed to stand for some days. The solution then contains a mixture of phenol-polyalcohols.

As another operation 380 parts of aniline are dissolved in 500 parts of concentrated hydrochloric acid and the solution is diluted and stirred with 300 parts of formaldehyde of 38 per cent. strength for 1 hour at 50° C. Then into the mixture thus obtained there is run, while stirring well, the above phenol-alcohol solution which is taken up without turbidity; the whole is poured into so much dilute caustic soda solution that the magma produced becomes only feebly acid. The whole is now made alkaline with sodium carbonate, filtered and the solid matter washed. The light colored powder thus obtained shows extraordinarily good fluxing and hardens at temperatures above 140° C. to pressed bodies of remarkable mechanical and chemical resistance.

Example 2

A solution of cresol-polyalcohols (di- or trimethylol cresols) is obtained in manner analogous to that described in Example 1 by substituting 108 parts of crude cresol for the phenol. When the condensation is complete 4000 parts of caustic soda solution of 4 per cent. strength are added and into this solution, while stirring, there is run a condensation solution made as described in Example 1 from 380 parts of aniline, 2000 parts of hydrochloric acid of 7 per cent. strength and 300 parts of formaldehyde solution of 38 per cent. strength. The amine-formaldehyde-resin and the cresol-polyalcohols are precipitated together. The solution must at the end be alkaline with sodium carbonate. The resin is filtered, washed and dried, and ground with 80 parts of furfural. By pressing the product, bodies of very good properties are obtained.

Example 3

An acid condensation solution made from 93 parts of aniline, 80 parts of concentrated hydrochloric acid, 1000 parts of water and 110 parts of the formaldehyde solution of 38 per cent. strength is allowed to flow into a strongly alkaline solution of phenol alcohols made by condensation of phenol with 1 mol. of formaldehyde in dilute alkaline solution and containing 25 parts of phenol-alcohol. The united solutions are made feebly alkaline with sodium carbonate and the precipitate thus obtained is filtered, washed and dried. The product can be pressed at 150° C. to bodies which are completely homogeneous.

Example 4

104 parts of anhydroformaldehydeaniline are stirred in 200 parts of warm water and 300 parts of hydrochloric acid of 12 per cent. strength are added. This mixture is stirred at 60–90° C. until everything is dissolved and, while still stirring, 15 parts of furfural are added. Then the whole is run into a solution of phenol-polyalcohols made by allowing to stand for several days 15 parts of phenol with 2½ equivalents of formaldehyde in a dilute alkaline solution, this solution of phenol-polyalcohols having been first mixed with sufficient sodium carbonate to neutralize the acid in the amine-resin solution. A voluminous precipitate is produced which is filtered, washed and dried; the powder flows very well under pressure to produce compressed bodies.

Example 5

108 parts of cresylic acid are dissolved in 200 parts of caustic soda solution of 20 per cent. strength, 280 parts of a formaldehyde solution of 38 per cent. strength are added in the cold and the whole is allowed to stand for some days. Then 40 parts of formaldehyde of the same strength are added and the mixture is run, while stirring well, into a solution of 186 parts of aniline in 3000 parts of hydrochloric acid of 3.6 per cent. strength at a temperature of 40° C. After stirring well during one hour at 40° C., the mass is neutralized by addition of carbonate of sodium, filtered and the solid matter washed. By pressing the powder at a temperature above 140° C., bodies of very good properties are obtained.

The term "primary aromatic amine", as employed in this application, is intended to cover not only true primary aromatic amines, such as aniline and its homologues, but also such derivatives thereof which under the conditions of the condensation described herein, also act like the true primary aromatic amines under the conditions of the present process to yield the same resins, for example, anhydroformaldehydeaniline, formylaniline or the homologues of those compounds, and the like.

The expression "formaldehyde yielding compounds" as employed herein, is intended to cover not only formaldehyde itself, but its polymers or any other substances splitting off formaldehyde or capable of forming methylene links under the conditions of the condensation, as it has been found that such substances or polymers may also be used in place of formaldehyde itself.

The term "synthetic resinous material", as used in this specification and claims, is intended to cover not only the pure resin, but all forms in which such resin may occur, namely, resin solutions, molding powder, molded article, impregnated cellulose material, in sheet form or loose, with or without the addition of fillers, plastifiers, coloring materials, and the like.

This application is a division of my application Serial No. 548,038 filed June 30, 1931, Patent No. 2,034,597.

What I claim is:—

1. The step in the process of manufacturing synthetic resins from amine-formaldehyde condensation products obtained by reacting a primary aromatic amine with at most an equimolecular proportion of a formaldehyde yielding compound in the presence of a mineral acid and subsequently precipitating the product by an agent of alkaline character, which comprises adding a phenolpolyalcohol to the condensation product resulting from the reaction of the primary aromatic amine and the formaldehyde yielding compound in the presence of the mineral acid at a stage prior to the drying of the resinous material, whereby the said phenolpolyalcohol is homogeneously adsorbed by said amine condensation product.

2. The step in the process of manufacturing synthetic resins from amine-formaldehyde condensation products obtained by reacting aniline with at most an equimolecular proportion of a formaldehyde yielding compound in the presence of a mineral acid and subsequently precipitating the product by an agent of alkaline character, which comprises adding a phenolpolyalcohol to the condensation product resulting from the reaction of the aniline and the formaldehyde yielding compound in the presence of the mineral acid at a stage prior to the drying of the resinous material, whereby the said phenolpolyalcohol is homogeneously adsorbed by said amine condensation product.

3. The step in the process of manufacturing synthetic resins from amine-formaldehyde condensation products obtained by reacting a primary aromatic amine with at most an equimolecular proportion of a formaldehyde yielding compound in the presence of a mineral acid and subsequently precipitating the product by an agent of alkaline character, which comprises adding phenol-polyalcohols to the condensation product resulting from the reaction of the primary aromatic amine and the formaldehyde yielding compound in the presence of the mineral acid at a stage prior to the drying of the resinous material, whereby the said phenol alcohols are homogeneously adsorbed by said amine condensation product.

4. The step in the process of manufacturing synthetic resins from amine-formaldehyde condensation products obtained by reacting aniline with at most an equimolecular proportion of a formaldehyde yielding compound in the presence of a mineral acid and subsequently precipitating the product by an agent of alkaline character, which comprises adding cresol-polymethylol to the condensation product resulting from the reaction of the aniline and the formaldehyde yielding compound in the presence of the mineral acid at a stage prior to the drying of the resinous material, whereby the said cresol-polymethylol are homogeneously adsorbed by said amine condensation product.

5. The process of manufacturing synthetic resinous material which comprises reacting a primary aromatic amine and at most an equimolecular proportion of a formaldehyde yielding compound in the presence of a mineral acid to form a condensation product, adding phenol polyalcohols to the acid solution of the condensation product, and thereafter treating the solution with an agent of alkaline character which causes the precipitation of the condensation product and the phenol polyalcohols, whereby the said phenol polyalcohols are homogeneously adsorbed by said amine condensation product.

6. The process of manufacturing synthetic resinous material which comprises reacting aniline and at most an equimolecular proportion of a formaldehyde yielding compound in the presence of a mineral acid to form a condensation product, adding phenol polyalcohols to the acid solution of the condensation product, and thereafter treating the solution with an agent of alkaline character which causes the precipitation of the condensation product and the phenol poly alcohols, whereby the said phenol polyalcohols are homogeneously adsorbed by said amine condensation product.

7. The process of manufacturing synthetic resinous material which comprises reacting a primary aromatic amine and at most an equimolecular proportion of a formaldehyde yielding compound in the presence of a mineral acid to form a condensation product, treating the solution with an agent of alkaline character and adding a phenol polyalcohol to the suspension of the precipitated condensation product, said phenol polyalcohol being capable of adsorption by said amine condensation product, whereby homogeneous admixture thereof is assured.

8. The process of manufacturing synthetic resinous material which comprises reacting aniline and at most an equimolecular proportion of a formaldehyde yielding compound in the presence of a mineral acid to form a condensation product, treating the solution with an agent of alkaline character and adding a phenol polyalcohol to the suspension of the precipitated condensation product, said phenol polyalcohol being capable of adsorption by said amine condensation product, whereby homogeneous admixture thereof is assured.

9. The step in the process of manufacturing synthetic resins from amine-formaldehyde condensation products obtained by reacting a primary aromatic amine with at most an equimolecular proportion of a formaldehyde yielding compound in the presence of a mineral acid and subsequently precipitating the product by an agent of alkaline character, which comprises adding a phenol polyalcohol to the condensation product resulting from the reaction of the primary aromatic amine and the formaldehyde yielding compound in the presence of mineral acid, and in substantial absence of unreacted amine, at a stage prior to the drying of the resinous product, whereby the said phenol polyalcohol is homogeneously admixed with said condensation product.

THEODOR SUTTER.